F. W. LANCHESTER.
TOOTH FORM FOR WORM GEAR.
APPLICATION FILED JULY 3, 1914.
1,210,494.
Patented Jan. 2, 1917.
2 SHEETS—SHEET 1.
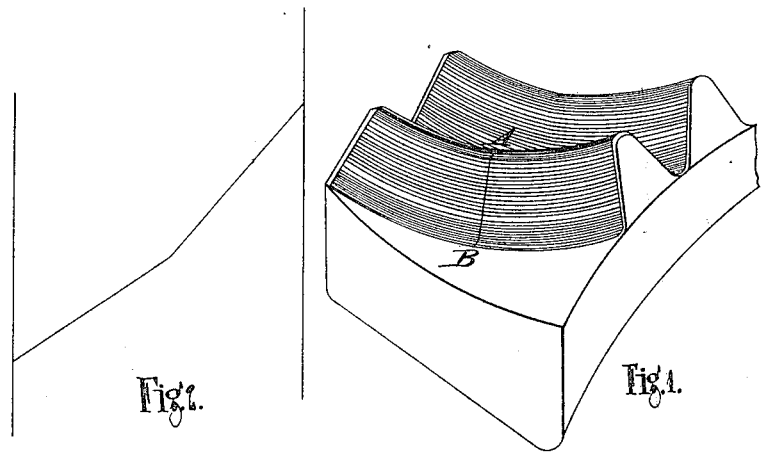
Fig. 2.    Fig. 1.
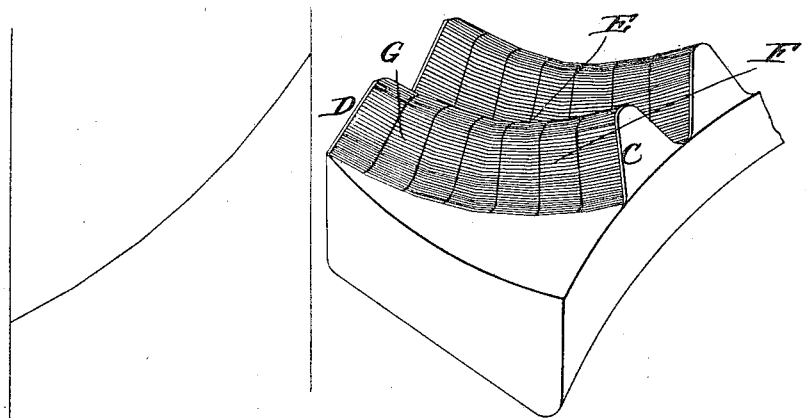
Fig. 4.    Fig. 3.
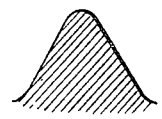 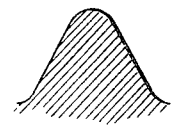 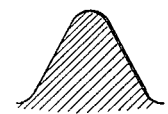
Fig. 8.    Fig. 8ª.    Fig. 8ᵇ.
WITNESSES
Em Hamilton
C E Parsons
INVENTOR
Frederick W. Lanchester.
BY
ATTORNEYS

F. W. LANCHESTER.
TOOTH FORM FOR WORM GEAR.
APPLICATION FILED JULY 3, 1914.

1,210,494.

Patented Jan. 2, 1917.
2 SHEETS—SHEET 2.

WITNESSES
INVENTOR
Frederick W. Lanchester.
BY Spear Middleton Donaldson & Spear
ATTORNEYS

UNITED STATES PATENT OFFICE.

FREDERICK WILLIAM LANCHESTER, OF EDGBASTON, BIRMINGHAM, ENGLAND.

TOOTH-FORM FOR WORM-GEAR.

1,210,494.  Specification of Letters Patent.  Patented Jan. 2, 1917.

Application filed July 3, 1914. Serial No. 848,808.

*To all whom it may concern:*

Be it known that I, FREDERICK WILLIAM LANCHESTER, a subject of the King of Great Britain and Ireland, and residing at 53 Hagley road, Edgbaston, Birmingham, in the county of Warwick, England, have invented a certain new and useful Tooth-Form for Worm-Gear, of which the following is a specification.

The present invention relates to an improved form of worm gear of the hollow worm type.

In the manufacture of worm gear, it has been my practice to cut out the form of the teeth by a machine such as is described in British Patent No. 13433 of 1897, but the form of tooth that is produced, unless subsequently modified, is not altogether satisfactory where the highest load capacity for size is required.

The present invention consists in an improved form of tooth, in which the thickness is varied at different points across the tooth.

The invention also consists in an improved worm gear in which the teeth are thicker in the neck of the worm and also at the ends than they are at the mean radial position.

Figure 5:
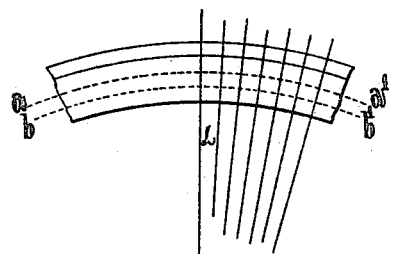
Figure 6:
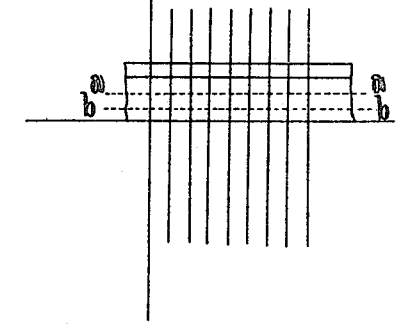
Figure 7:
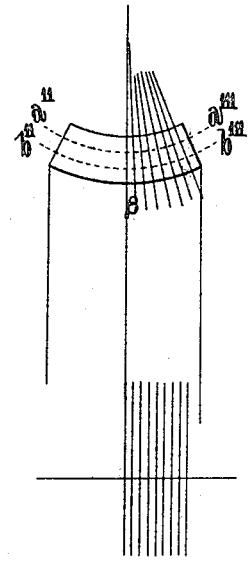

Referring to the accompanying drawings, Figure 1 shows in a somewhat exaggerated form the face of a tooth of a worm wheel as ordinarily constructed. Fig. 2 is a diagrammatic plan of Fig. 1. Fig. 3 shows the face of a worm wheel tooth embodying the present invention. Fig. 4 is a diagrammatic plan of Fig. 3. Figs. 5, 6 and 7 show the method of development adopted in obtaining the diagrammatic views shown in Figs. 2 and 4. Figs. 8 and 8$^b$ show sections of the worm at the ends and at the neck, and Fig. 8$^a$ shows a section at the mean radial positions F and G. It will be seen that the thickness of the section at F and G is greater than at C, D, and E.

In worm wheel teeth as usually constructed, the finished surface of the tooth approximates to two curved surfaces, making a slight angle with one another and meeting along the line A—B, as shown at Figs. 1 and 2. The result of this is that when working in conjunction with a worm passing over any given tooth, the thread of the worm changes over from one surface to the other of the tooth, and for an instant the whole driving pressure is borne by the angle formed by the junction of the two surfaces. This causes overloading of the surface at this point, squeezing out the oil film, and destruction of the surface. In a worm wheel constructed according to the present invention, these difficulties are overcome by giving to the tooth a form such as that illustrated in Figs. 3 and 4. From Fig. 3 it will be seen that by the process of manufacture, an almost continuous curved surface right across the whole width of the tooth is obtained.

In order to understand the form of tooth which is to be made in the worm gear, it should be pointed out that in the Hindley type of worm gear on which the present gear is an improvement, each concentric element of the wheel tooth surface continuously engages with a corresponding element of the worm, and does not, as in ordinary tooth gearing, change its relative position to the worm tooth during its period of engagement. The result of this is that each concentric surface of the gear and its worm can be considered quite apart from the rest of the gear teeth. In other words, the total gear tooth formed consists of an arbitrary series of concentric laminæ supposed in the limit to become indefinitely thin, so as to avoid any steps in the tooth form. The gear tooth form in the ordinary sense of tooth form is thus emancipated from all ordinary considerations of rolling contact, and the arbitrary form assigned by the designer is merely based on the considerations of manufacture and of assembling the parts, that is to say, the tooth is preferably made of an angular section so as to be readily generated and of such a steepness of slope as will avoid undercut such as would prevent a gear wheel and its worm being put into mesh or taken apart.

In practice an angle of about 1 in 2 slope, or say 30 degrees, that is to say, a contained worm angle of about 55 to 60 degrees, such as employed in an ordinary Whitworth or Sellers bolt is found to give satisfactory results.

It will be understood from the above that the corrections of tooth form according to this invention do not relate to corrections as to the V form of tooth, but they relate to corrections such as can be represented by the development of one of the lamina elements of the gear, such as illustrated in Figs. 2 and 4. It should be noted that the correction is actually applied to the worm, but it is directed to obtain the results stated for the wheel.

In the finished form of the tooth, as shown at Fig. 3, each tooth of the worm wheel is thinner at the ends C—D and at the neck E, than it is at the mean radial positions F and G, and the working surfaces of the tooth are formed by a plurality of facets approximating to a continuous uniform curved surface.

The method of obtaining the developed views, Figs. 2 and 4, is illustrated in Figs. 5, 6 and 7. The lamina $a$, $a'$, $a''$, $a'''$, is developed by making equal increments of abscissæ, Fig. 6, represent equal increments of the angle $\alpha$, Fig. 5, while in Fig. 7, equal increments of abscissæ represent equal increments of the angle $\beta$. The intersection of a tooth face with the laminæ is then plotted, giving for the ordinary worm as shown in Fig. 1 the result shown in Fig. 2, and for the worm shown in Fig. 3 constructed according to the invention, the results shown in Fig. 4.

Having now described my invention, what I claim as new and desire to secure by Letters Patent is:—

1. A form of worm gear tooth in which the teeth of the worm are thinner in the neck and also at the ends, than they are at the mean radial position.

2. A form of worm wheel of the hollow type, in which the working surfaces of the tooth are formed by a plurality of facets approximating to a continuous uniform curved surface.

In testimony whereof, I affix my signature in presence of two witnesses.

FREDERICK WILLIAM LANCHESTER.

Witnesses:
P. A. OURTWAITE,
E. C. WALKER.

Copies of this patent may be obtained for five cents each, by addressing the "Commissioner of Patents, Washington, D. C."